(12) United States Patent
Abdel-kader (10) Patent No.: US 8,050,241 B2
(45) Date of Patent: Nov. 1, 2011

(54) DETERMINING IDENTIFIERS FOR WIRELESS NETWORKS

(75) Inventor: Sherif Aly Abdel-kader, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 736 days.

(21) Appl. No.: 11/565,290

(22) Filed: Nov. 30, 2006

(65) Prior Publication Data

US 2008/0130595 A1    Jun. 5, 2008

(51) Int. Cl.
H04W 4/00 (2009.01)
H04J 1/00 (2006.01)
H04L 12/28 (2006.01)
H04B 7/00 (2006.01)

(52) U.S. Cl. ......... 370/338; 370/343; 370/431; 455/515

(58) Field of Classification Search .................... 370/338
See application file for complete search history.

(56) References Cited

U.S. PATENT DOCUMENTS

| | | | |
|---|---|---|---|
| 2003/0158922 A1* | 8/2003 | Park | 709/222 |
| 2004/0110530 A1* | 6/2004 | Alone et al. | 455/552.1 |
| 2004/0249977 A1* | 12/2004 | Minamisawa | 709/245 |
| 2005/0272420 A1 | 12/2005 | Matsuda et al. | |
| 2006/0135068 A1 | 6/2006 | Jaakkola et al. | |
| 2006/0140187 A1 | 6/2006 | Fujinami | |
| 2006/0174330 A1 | 8/2006 | Yoon et al. | |
| 2006/0227972 A1 | 10/2006 | Brok et al. | |
| 2006/0242412 A1 | 10/2006 | Jung et al. | |
| 2008/0082543 A1* | 4/2008 | Abhishek et al. | 707/10 |

FOREIGN PATENT DOCUMENTS

| | | |
|---|---|---|
| EP | 1061694 A2 | 12/2000 |
| EP | 1 480 389 A | 11/2004 |
| EP | 1480389 A2 | 11/2004 |
| EP | 1670180 A1 | 6/2006 |
| EP | 1708415 A1 | 10/2006 |
| JP | 2005094164 A2 | 4/2005 |
| WO | WO2005094474 A2 | 10/2005 |
| WO | WO2005104459 A1 | 11/2005 |
| WO | WO 2006/067595 | 6/2006 |
| WO | WO2006066181 A1 | 6/2006 |

OTHER PUBLICATIONS

OMA Change Request for title "WLAN Bearer Settings for Client Provisioning", Jun. 21, 2005, Janne Vento, Nokia.
WebSTAR™ Model DPW941™ Wireless Ethernet Adapter User's Guide, Scientific-Atlanta, Inc., pp. 1-58, Jun. 2005.
Office Action dated Jul. 23, 2010 from corresponding Mexican Patent Application No. MX/A/2007/014851.

* cited by examiner

Primary Examiner — Lester Kincaid
Assistant Examiner — Andy Gu (57) ABSTRACT

A method for determining an identifier of a wireless network to which a mobile device can connect. For at least one wireless network, an identifier and at least one address for component(s) in that network is stored on the mobile device. An address of a component in an available network is received. If the address of the component is received without an identifier for the network, the received address is compared with at least one stored address. If the received address matches one of the at least one stored address, the identifier stored in association with that address is obtained. A module and a mobile device for implementing the method comprise a memory, a receiver, a comparison module and an interface module.

9 Claims, 9 Drawing Sheets

DETERMINING IDENTIFIERS FOR WIRELESS NETWORKS

TECHNICAL FIELD

The present application relates to a method, module and wireless device for determining an identifier of a wireless network to which the wireless device can connect.

BACKGROUND

In some WiFi capable devices for use in WLANs (Wireless Local Area Networks), users may create profiles for networks and/or APs (Access Points) to which they commonly connect. These profiles are stored in profile tables or lists on the devices to enable the devices to automatically connect to a network listed in the profile table for that device when the device in the range of that network. A profile usually contains an SSID (Service Set Identifier) for the network and security parameters, such as whether the network is Open or Secure and security keys.

Each AP in a WLAN has one or more MAC (Medium Access Control) address for the AP and one or more SSID for the networks to which the AP belongs. Some networks have what is known as "hidden SSIDs". A hidden SSID is not disclosed in response to a scan or probe for availability of the network, or in the beacon that the AP transmits regularly. To join such a network, a user must know the SSID and usually the user will conduct a directed probe using the known SSID to check availability.

Some WiFi capable devices perform scans and probes in accordance with IEEE Standard 802.11 to determine which APs and/or peer devices are available. A broadcast probe request is sent to determine all APs and/or devices that are WiFi capable in the range of the user device. Each AP/device found sends a probe reply containing its respective MAC address. The probe reply also indicates whether or not the address belongs to an infrastructure device, such as an AP, or an independent wireless device, such as a laptop or handheld device. The probe reply will also include the SSID, if it is not hidden. Broadcast probe requests are also known as broadcast scans or site surveys. After the probe reply is received, the results are stored on the wireless device, usually in (Random Access Memory). A user can then select an AP/device from the scan results and connect to that device it the SSID is not hidden. Furthermore, scanning can be defined as either passive or active. Passive scanning involves listening for the beacon transmitted by the AP. Active scanning is performed by sending "probe request" packets to a broadcast MAC address. If the probe request packet contains an SSID, then it is known as a directed probe. If the probe request does not contain an SSID it is known as a broadcast probe or discover probe.

Directed probe requests that are sent directly to a specific network are also possible. In order to send a directed probe request the user must know the SSID of the network of the AP or device.

Typically, a WiFi capable device will send a broadcast probe first to determine all APs or other mobile device to which it can connect. If some of the APs listed in the scan result have hidden SSIDs, some devices are programmed to go through each profile stored on the device and send a directed probe to each SSID to ensure that all of the available APs from networks listed on the profile table for that device are added to the scan result. If the list of profiles is long, this can be time consuming. Furthermore, each probe uses valuable battery power in battery operated mobile devices because rather than putting the mobile device in sleep (or doze) mode, the mobile device is in active mode transmitting and/or receiving packets such as beacons, probe requests, probe responses, etc.

BRIEF DESCRIPTION OF THE DRAWINGS

Examples of embodiments will now be described in greater detail with reference to the accompanying drawings, in which.

DETAILED DESCRIPTION

In one aspect, there is provided a method for determining an SSID (Service Set Identifier) of a wireless network to which a mobile device can connect, the method comprising: for at least one wireless network, storing on the mobile device an SSID and at least one MAC (Medium Access Control) address for component(s) in that network; receiving a MAC address of a component in an available network; if the MAC address of the component is received without an SSID for the network, comparing the received MAC address with at least one stored MAC address; and if the received MAC address matches one of the at least one stored MAC address, obtaining the SSID stored in association with that MAC address.

In another aspect, there is provided a computer readable medium for determining an SSID (Service Set Identifier) of a wireless network to which a mobile device can connect, the computer readable medium comprising: an address comparator for, if a MAC (Medium Access Control) address is received without an SSID for the network in response to a query for available networks, comparing the received MAC address with at least one MAC address stored in association with an SSID on the mobile device; and a retrieving module for, if the received MAC address matches one of the at least one stored MAC address, obtaining the SSID stored in association with that MAC address.

In another aspect, there is provided a mobile device adapted to be connected to at least one wireless network, the mobile device comprising: a wireless access radio for communicating with the at least one wireless network; a memory having stored thereon, for at least one wireless network, an SSID (Service Set Identifier) and at least one MAC (Medium Access Control) address for component(s) in that network; an address comparing function for, if a MAC address is received without an SSID for an available network, comparing the received MAC address with at least one MAC address stored in the memory and for obtaining the SSID stored in association with that MAC address from the memory, if the received MAC address matches one of the at least one stored MAC address; and a processor for implementing the address comparing function.

In another aspect, there is provided a method for determining an identifier of a wireless network to which a mobile device can connect, the method comprising: for at least one wireless network, storing an the mobile device an identifier and at least one address for component(s) in that network; receiving an address of a component in an available network; if the address of the component is received without an identifier for the network, comparing the received address with at least one stored address; and if the received address matches one of the at least one stored address, obtaining the identifier stored in association with that address.

In another aspect, there is provided a method for determining an identifier of a wireless network to which a mobile device can connect, the method comprising: storing for at least one network, an indication of whether or not an identifier for the network is expected to be provided together with an address for a component of the network; for the at least one wireless network, storing on the mobile device the identifier and at least one address for component(s) in that network; receiving an address of a component in an available network; if the address of the component is received without an identifier for the network, comparing the received address with at least one stored address, and if the received address matches one of the at least one stored address, obtaining the identifier stored in association with that address.

In another aspect, there is provided a method for updating a user profile table for a mobile device, the method comprising conducting a scan for all available wireless networks; comparing identifiers for networks in results from the scan with identifiers of wireless networks located in the user profile table; if an identifier for a network from the user profile table is found in the results, updating the user profile table to indicate that the identifier for that network is not hidden.

Figure 1A:
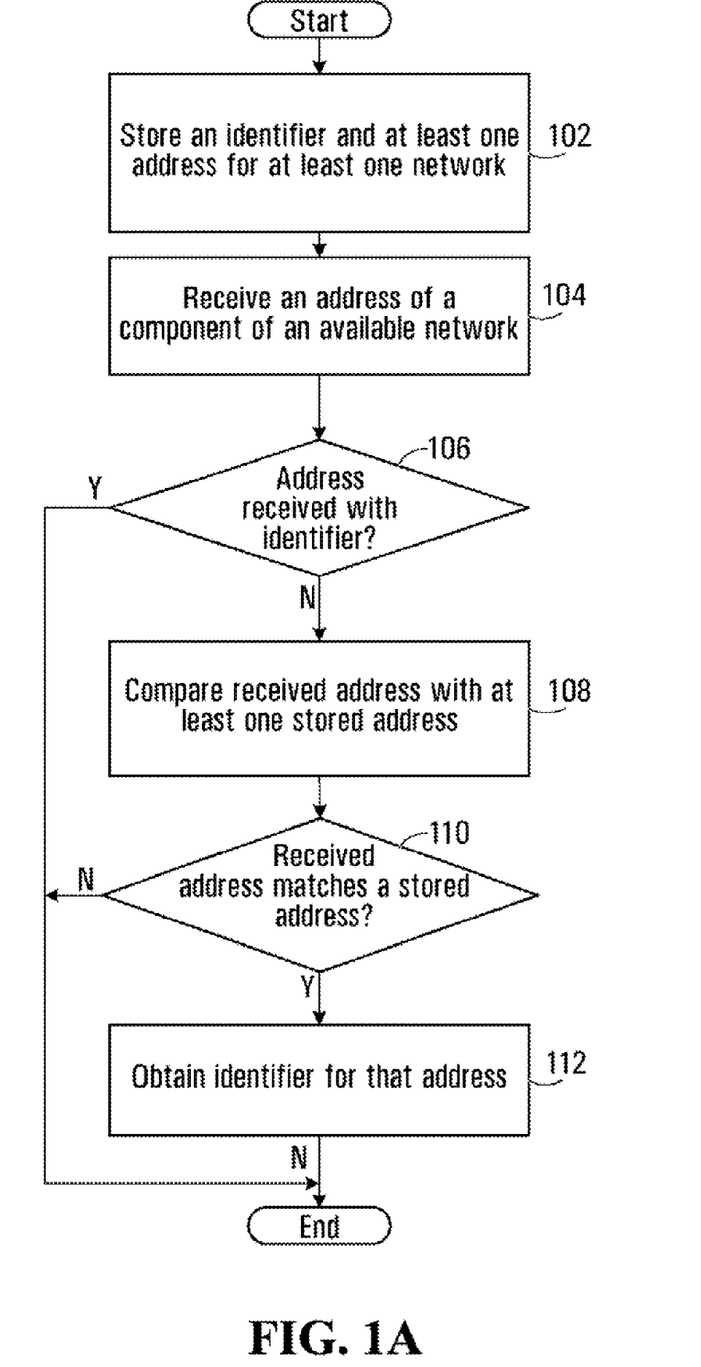
FIG. 1A is a flow chart of a method for determining an identifier of a wireless network.

Referring first to FIG. 1A, a flowchart of a method for determining an identifier of a wireless network to which a mobile device can connect is shown. After the method starts, Step 102 comprises storing on the mobile device an identifier and at least one address for component(s) in a network, for at least one wireless network. In some embodiments, the identifier and address are stored on a computer readable medium, such as non-volatile memory. An example is flash memory. In some mobile devices, the identifier and address are stored as part of a profile table that includes identifiers and addresses for a selection of networks to which the mobile device regularly connects or to which the mobile device is permitted to connect. There may be multiple addresses for some networks.

At Step 104, an address of a component in an available network is received. In some embodiments, this address is received in response to a scan for available networks. For example, some mobile devices regularly conduct scans for networks to which they can connect. The scan may be in compliance with IEEE standard 802.11. Some addresses are received with an identifier that identifies the network in which the component is located. However, other addresses are received without such an identifier. The identifiers that are not provided are sometimes known as hidden identifiers. If the address is received with an identifier (Yes path of Decision Step 106), there is no requirement to determine the identifier and the method ends.

If the address of the component is received without an identifier for the network (No path of Decision Step 106), the method continues and compares the received address with at least one stored address. The comparison is made for some or all of the addresses in Step 102. Specific examples are detailed below. If the received address matches one of the at least one stored address (Yes path of Decision Step 110), the next step is to obtain the identifier stored in association with that address (Step 102). Then the method ends. Comparing the addresses avoids conducting directed probes to determine an identifier that is stored on the mobile device. This is made possible by having the addresses stored in association with the identifiers on the mobile device.

If the received address did not match at least one stored address (No path of Decision Step 110), the method ends. In some embodiments, if there was no match, a directed probe is conducted to determine availability of all components associated with at least one identifier stored on the mobile device. The results of the directed probe can be compared with the received address to determine if the received address is a component of the network associated with the at least one identifier. By doing a directed probe, the mobile device will know that any AP that responds will have the SSID that it used in the probe request packet. Any addresses returned that are not already stored on the mobile device can then be added to the stored addresses.

Some embodiments of the method further comprise storing, for each of the at least one network, an indication of whether or not the identifier for the network is expected to be provided together with an address for a component in the network. In some of these embodiments, the at least one stored address compared in Step 108 comprises addresses associated with networks indicated as having an identifier not expected to be provided. An example of this method will be described with reference to FIG. 1B.

Figure 1B:
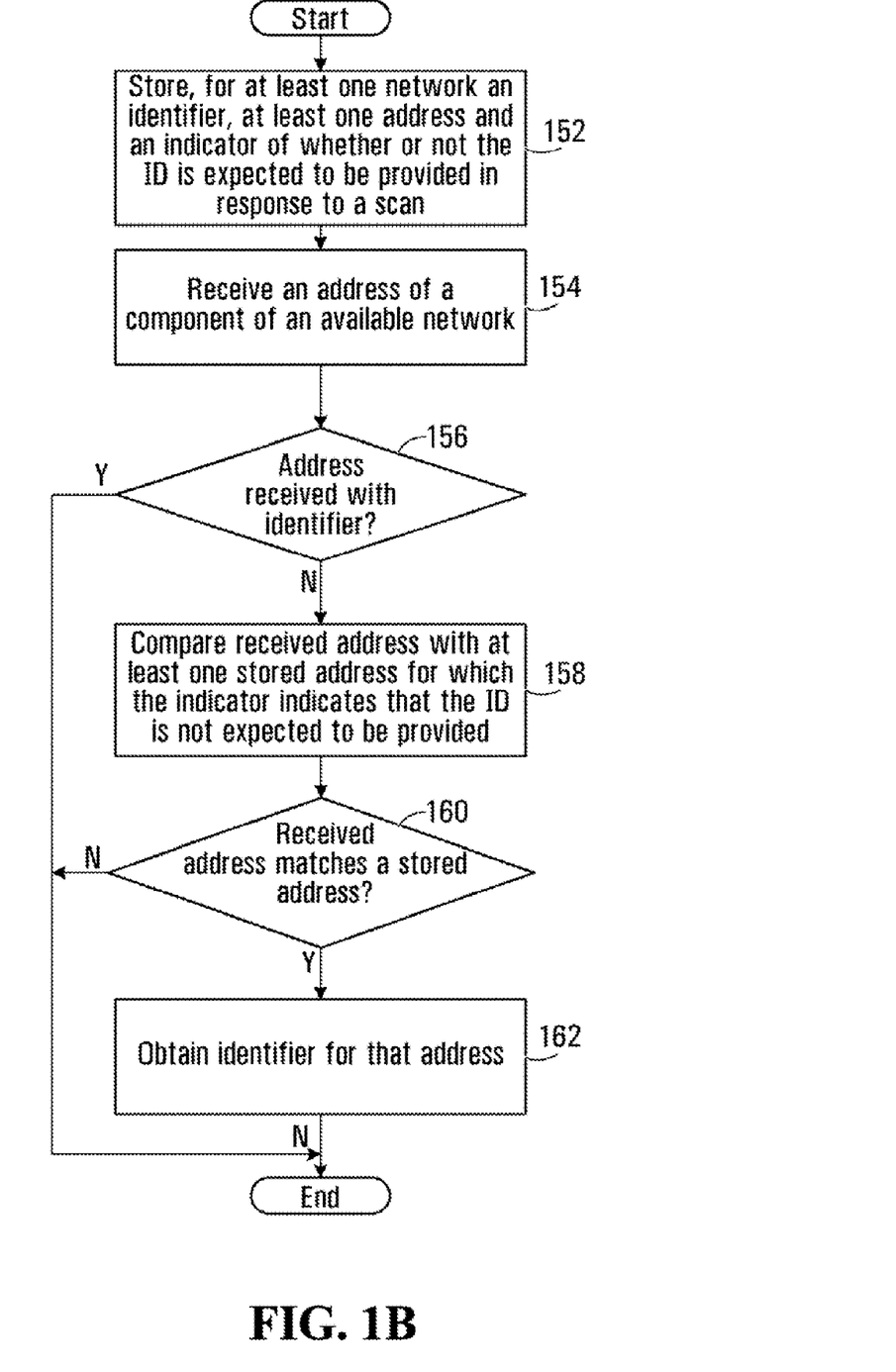
FIG. 1B is a flow chart of a method for determining an identifier of a wireless network.

The flowchart of FIG. 1B follows the same logic as FIG. 1A. Steps 152, 154, 156, 158, 160, aid 162 of FIG. 1B correspond to Steps 102, 104, 106, 108, 110, and 112 of FIG. 1A. At Step 152, in addition to storing the identifier and at least one address for the at least on network, an indicator of whether or not the identifier is expected to be provided is stored. Methods of determining this indicator are detailed below. At Step 158, the received address is compared with at least one stored address for which the indicator indicates that the identifier is not expected to be provided. Otherwise, the steps are the same as those described with reference to FIG. 1A. In some embodiments, addresses are only stored for components of networks for which the indicator is not expected to be provided. In some embodiments, if the address of the component of the available network is received with an identifier for the available network, the received identifier is compared with at least one stored identifier. If the received identifier matches the at least one stored identifier, the stored identifier is updated to indicate that the identifier is expected to be provided.

As detailed above, the method can also comprise performing a scan to locate available wireless networks to which the mobile device can connect, and receiving results of the scan comprising addresses of available components in available networks. In such case the comparing the received address and obtaining the identifier can be repeated for all addresses in the results of the scan for which no identifier was received. In still further embodiments, the method also comprises adding to the results of the scan any identifier obtained from the stored identifiers after a match.

Furthermore, if after the adding there are addresses remaining in the results of the scan without identifiers, a directed probe may be, conducted for availability of at least one wireless network having a stored identifier not expected to be provided. In some cases where a directed probe has been conducted, the method also comprises comparing addresses received in response to the directed probe with at least one address stored in association with the network for which the directed probe was conducted. Then, any addresses received in response to the directed probe that do not match any of the at least one stored address can also be stored in association with the network. Furthermore, the stored identifier can be added to the scan results. In this manner the stored addresses can be updated automatically without a user having to locate and input new addresses.

Figure 1C:
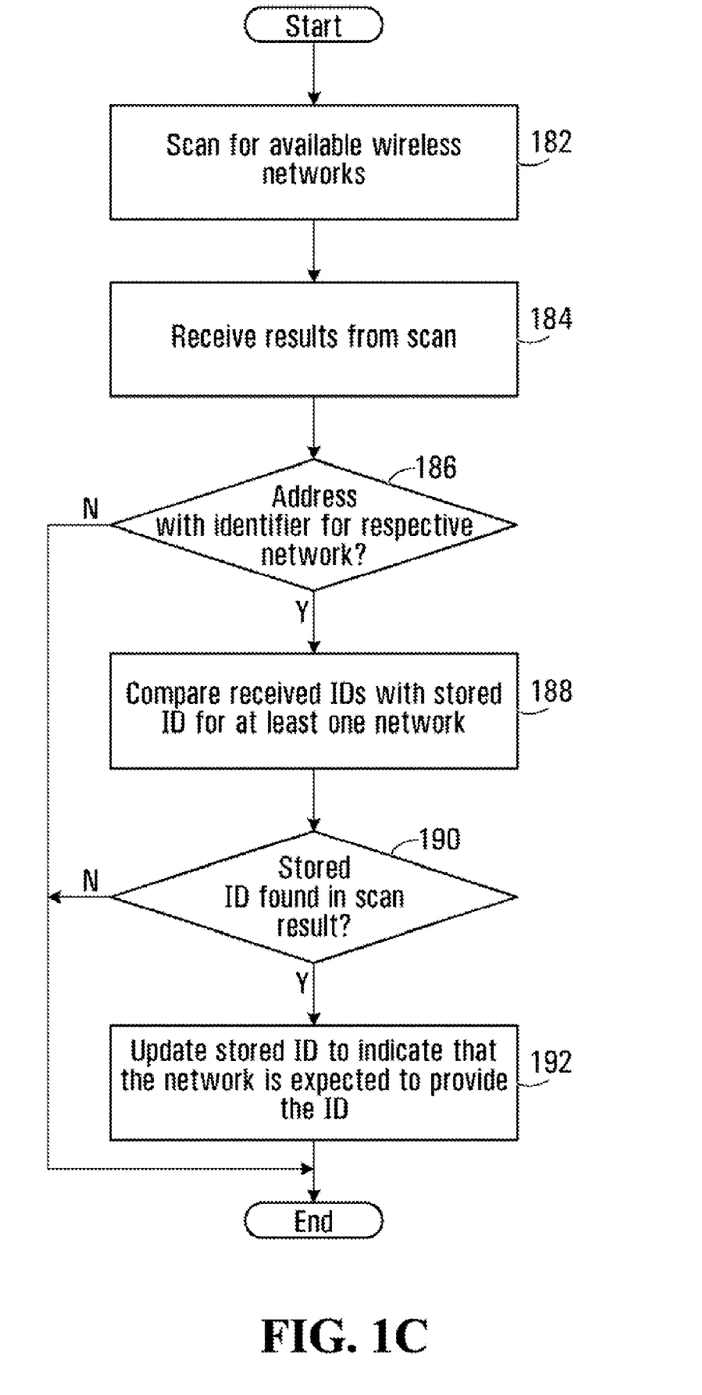
FIG. 1C is a flow chart of a method for updating a stored identifier on a mobile device.

In some embodiments, the storing (Steps 102 and 152) is made up of a number of steps. A method for conducting the storing will now be discussed with reference to FIG. 1C. The method starts with a scan for all available wireless networks (Step 182) and receiving results from the scan comprising addresses of components in the available networks (Step 184). If any addresses are received with identifiers for the respective network associated with the addresses (Yes path of Decision Step 186), the identifiers in the results from the scan are compared with the stored identifier of the at least one wireless network (Step 188). Then, if a stored identifier is found in the results (Yes path of Decision Step 190), the stored identifier is updated to indicate that the identifier for that network is expected to be provided (Step 192). The method then ends. If the answer at either of Steps 186 or 190 is no, the method will end at that point. This method can be used to populate a field indicating whether or not an SSID is hidden or not in a profile table on a mobile device. Likewise, any addresses received in the scan results with an identifier that matches stored identifiers can be stored in association with the stored identifier, if they are not already stored on the mobile device. Thus, new profiles can be optionally appended to existing profiles on the mobile device.

In some embodiments, the network is a WLAN. However, it is to be understood that the network can be any wireless network where identifiers are not always provided together with addresses of components of the network. For example, the methods may be applied in a cellular network, if identifiers are not always provided to users.

The term identifier, as used herein, refers to any identifier unique to a particular network. In some embodiments, the identifier is an SSID. The term address, as used herein, is any address or identifier unique to a component. In some embodiments, the address is a MAC address unique to the respective component. A component is any component in a network, including but not limited to other wireless devices and APs.

The methods described herein can be implemented by any combination of hardware or software. In some embodiments computer readable media on mobile devices are used to implement the method. One such computer readable medium 200 will now be described with reference to FIG. 2.

Figure 2:
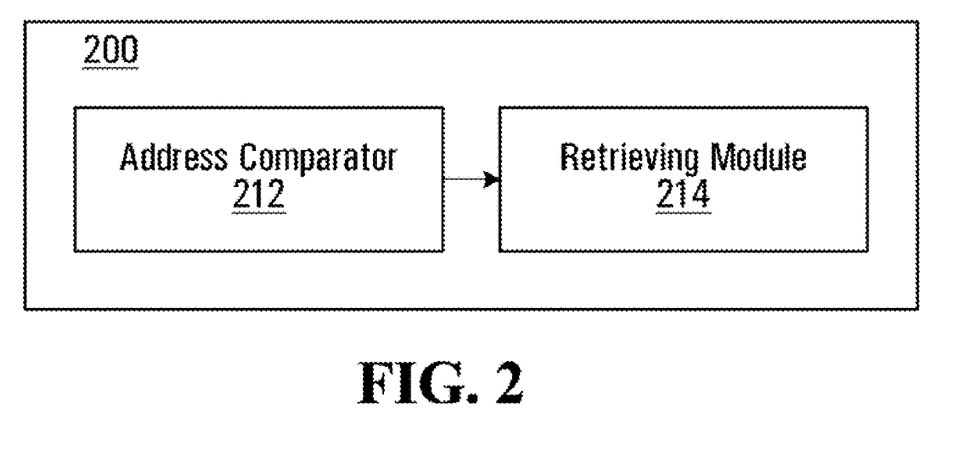
FIG. 2 is a block diagram of a module for a mobile device for determining an identifier of a wireless network.

The computer readable medium 200 is for determining an identifier of a wireless network to which a mobile device can connect. The computer readable medium comprises an address comparator for, if an address is received without an identifier for the network in response to a query for available networks, comparing the received address with at least one address stored in association with an identifier on the mobile device; and a retrieving module for, if the received address matches one of the at least one stored address, obtaining the identifier stored in association with that address.

In some embodiments, the mobile device also has stored thereon an indication of whether or not the identifier for the network is expected to be provided with an address for a component in the network stored thereon. In some of these cases, the at least one stored address comprises addresses associated with networks indicated as having an identifiers not expected to be provided.

Figure 3:
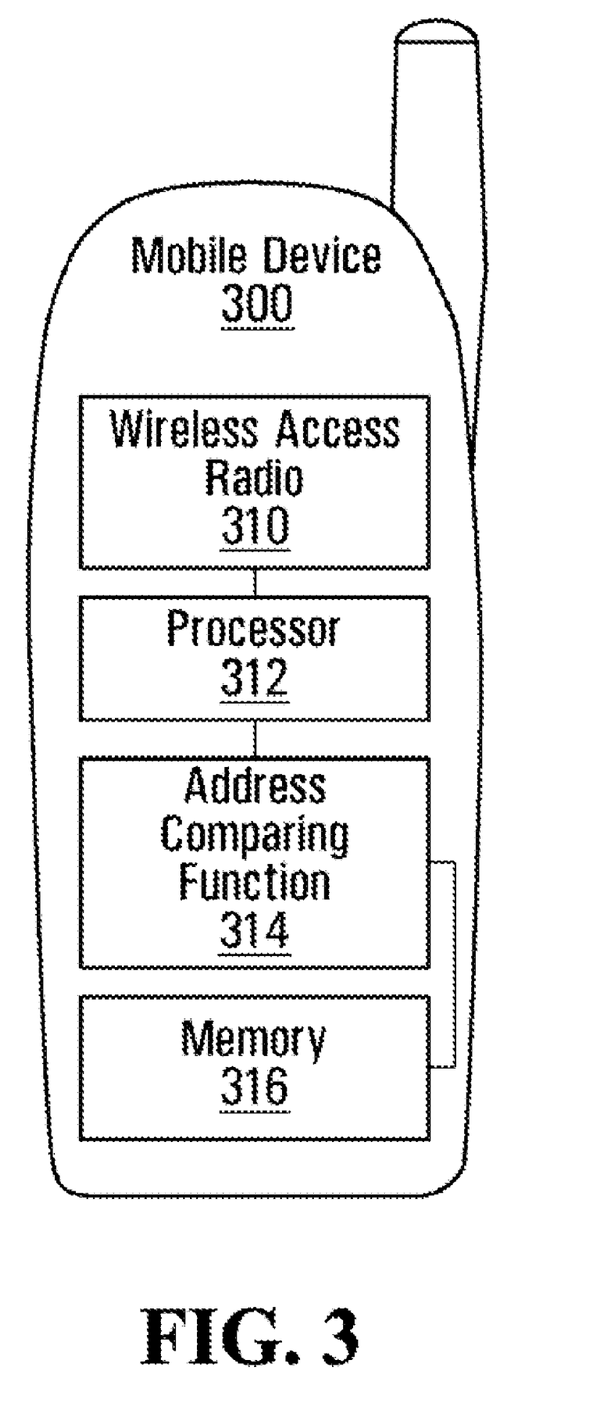
FIG. 3 is a block diagram of a mobile device adapted to be connected to at least one wireless network.

A mobile device 300 adapted to connected to at least one wireless network will now be described with reference to FIG. 3. The mobile device 300 comprises a wireless access radio 310, a processor 312, an address comparing function 314, and a memory 316. The wireless access radio 310 is for communicating with the at least one wireless network. The memory 316 has stored thereon, for at least one wireless network, an identifier and at least one address for component (s) in that network. The address comparing function 314 is for, if an address is received without an identifier for an available network, comparing the received address with at least one address stored in the memory. The address comparing function 314 also obtains the identifier stored in association with that address from the memory, if the received address matches one of the at least one stored address. The processor 312 is for implementing the address comparing function.

In some embodiments of the mobile device 300, the memory 316 also has stored thereon an indication of whether or not the identifier for the at least one network is expected to be provided together with an address for a component in the network. In some of these embodiments, the at least one stored address comprises at least one address associated with a network indicated as having an identifier not expected to be provided.

In some embodiments, the mobile device 300 further comprises a user interface adapted to permit a user to select a wireless network to which to connect.

Figure 7:
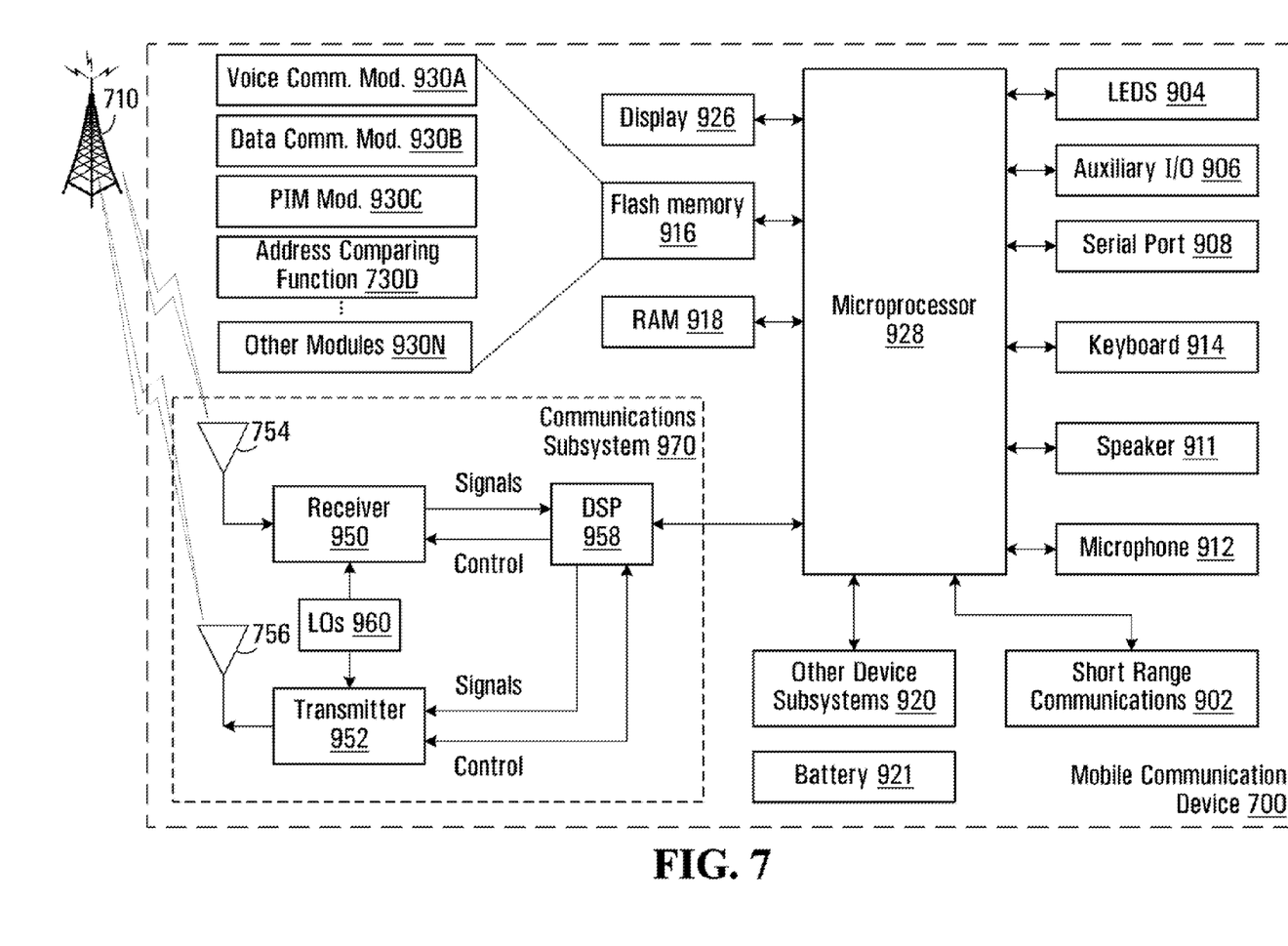
FIG. 7 is a block diagram of a mobile device on which the methods described herein may be executed.

There are many possibilities for mobile device 300. FIG. 7, described below, is a block diagram of a another mobile device 780 that may implement any of the methods described herein.

Figure 4:
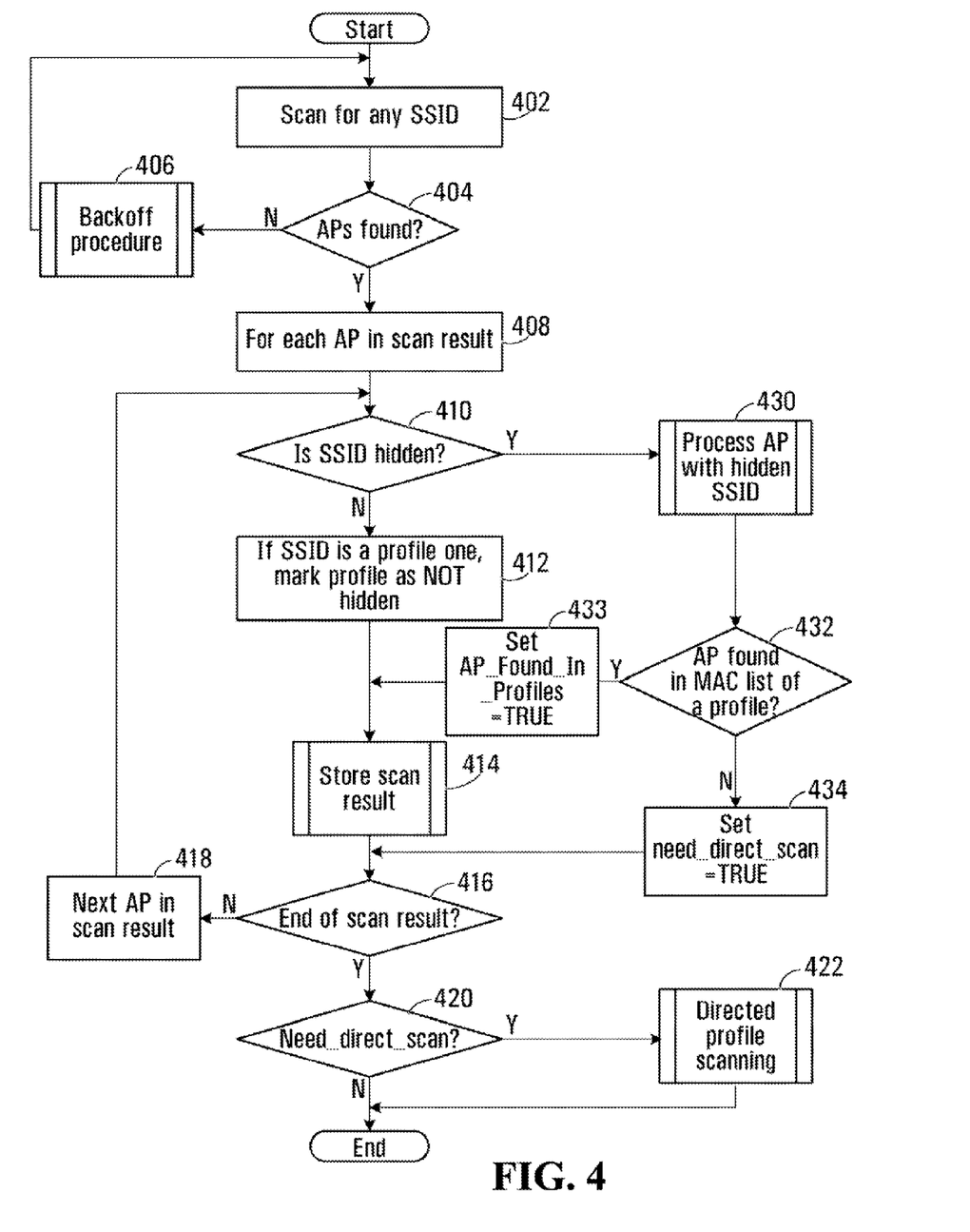
FIG. 4 is a flowchart of a method of conducting scans for available wireless networks and available components within those networks.

FIG. 4 is a flowchart of a specific embodiment of a method for performing a scan for available WLANs in the vicinity of a mobile device. This method is implemented by a mobile device having a profile table. The profile table includes information for wireless networks that can be selected by a user. For each wireless network, the profile table includes an SSID, an indication of whether or not the SSID is hidden and at least one MAC address for at least one AP in the wireless network. In some embodiments, the at least one MAC address is only stored if the SSID is hidden. In other embodiments the profile table also includes security parameters, such as whether or not communications in the network are encrypted and encryption keys. Another feature that may be included in the profile table is whether the profile uses DHCP (Dynamic Host Control Protocol) to automatically obtain an IP address, or uses a predefined IP address.

The method starts and proceeds to a first step of scanning for any SSID or addresses of components or APs in available networks (Step 402). Step 404 poses a query of whether or not any APs were found. If the answer is no, the method proceeds to a back-off procedure (Step 406) and then the method repeats. In some embodiments, the back-off procedure includes putting the mobile device in sleep mode and waiting for a predetermined period before starting the method again. If APs are found in the scan at Step 404, the remainder of the method is repeated for each AP found (Step 408). Step 410 is a decision block, which determines whether or not the SSID of the AP is hidden, i.e. was it hidden or not. If the answer is yes, the next step is to conduct a process for APs with hidden SSIDs (Step 430). The process for APs with hidden SSIDs will be discussed in detail with reference to FIG. 5. Then, the next step is a decision block to look for the MAC address of the AP in the MAC addresses listed for a profile in the profile table (Step 432). If the answer MAC was not found (No path of Step 432), an indicator that a directed profile scan is required is set to TRUE (Step 434). If the MAC address was found at Step 432 (Yes path), the method proceeds to Step 433 where a flag AP_Found_In_Profiles is set to TRUE. Then at Step 414 the scan result for that found AP is stored in a memory on the mobile device, the scan result including the MAC address and SSID for the AP. If the answer at Step 410 is no, the method proceeds with Step 412, which includes marking the profile for that SSID as not hidden in the profile table. The scan result for that AP is then stored in a memory on the mobile device at Step 414 together with the SSID. After Step 414, Step 416 determines if the AP is the end of the scan results. If the answer is no, the method is repeated (Step 418) for the next AP starting at Step 410. If the answer at Step 416 is yes, the method proceeds to Step 420, where a determination of whether of not a directed scan is required is made. If the answer is yes at Step 420, a directed profile scan is conducted at Step 422. The details of the directed profile scan will be discussed with reference to FIG. 6. After the directed profile scan, the method then ends. Likewise, if the answer at Step 420 was no, the method ends.

Figure 5:
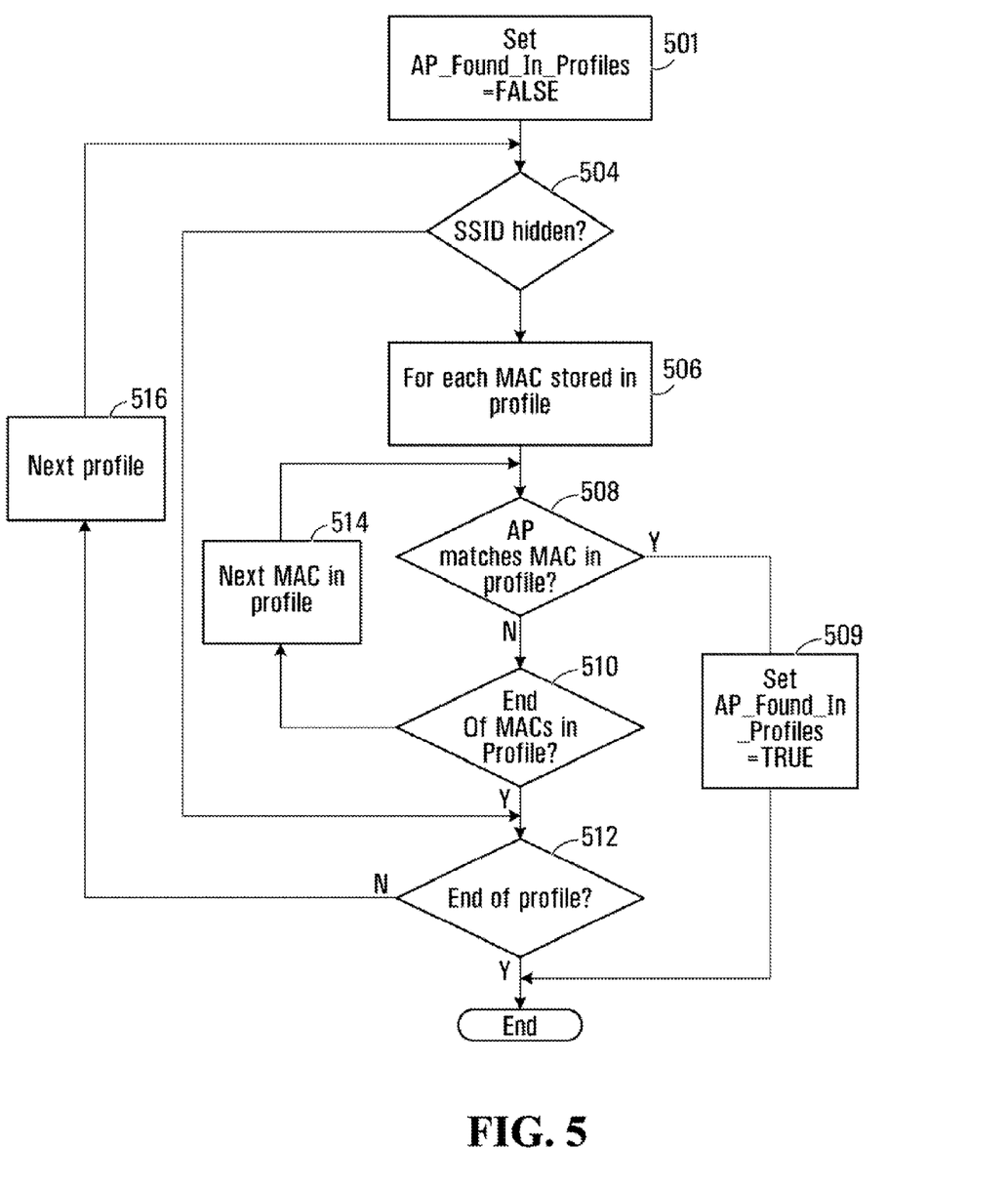
FIG. 5 is a flowchart of a process for determining an SSID for an AP MAC address returned without an SSID in reply to a broadcast scan.

A process for APs with hidden SSIDs, such as Step 430 mentioned in the discussion of FIG. 4, will now be discussed with reference to FIG. 5. For each AP, the process starts at Step 501. The first step in the process is to set the flag AP_Found_In_Profiles to FALSE. Then the following method is repeated for each profile. A determination of whether or not the SSID for that profile is hidden is made at Step 504. This is done by checking the field in the table that includes the indication that the SSID is hidden or not hidden. If the answer is no, the process advances to Step 512, which is a determination of whether the profile is the end of the profiles in the profile table. If the answer at Step 504 is yes, the process ends. If the answer at Step 512 is no, the process repeats again starting at Step 504. If the answer at Step 504 is yes, the process goes to Step 506, which is the start of process that is conducted for each MAC address for that particular profile. At Step 508, a determination of whether the MAC address of the AP from the scan result matches the MAC address stored in the profile is made. If the answer is yes, the flag AP_Found-_In_Profiles is set to TRUE (Step 509) and the process ends. If the answer at Step 508 is no, the process proceeds to Step 510 which is another decision block. Step 510 determines whether or not the MAC address is the last MAC address for that profile. If the answer is no, the process is repeated (Step 514) starting at Step 508 for the next MAC address in that profile. If the answer at Step 510 is yes, the process continues at Step 512 described above.

Figure 6:
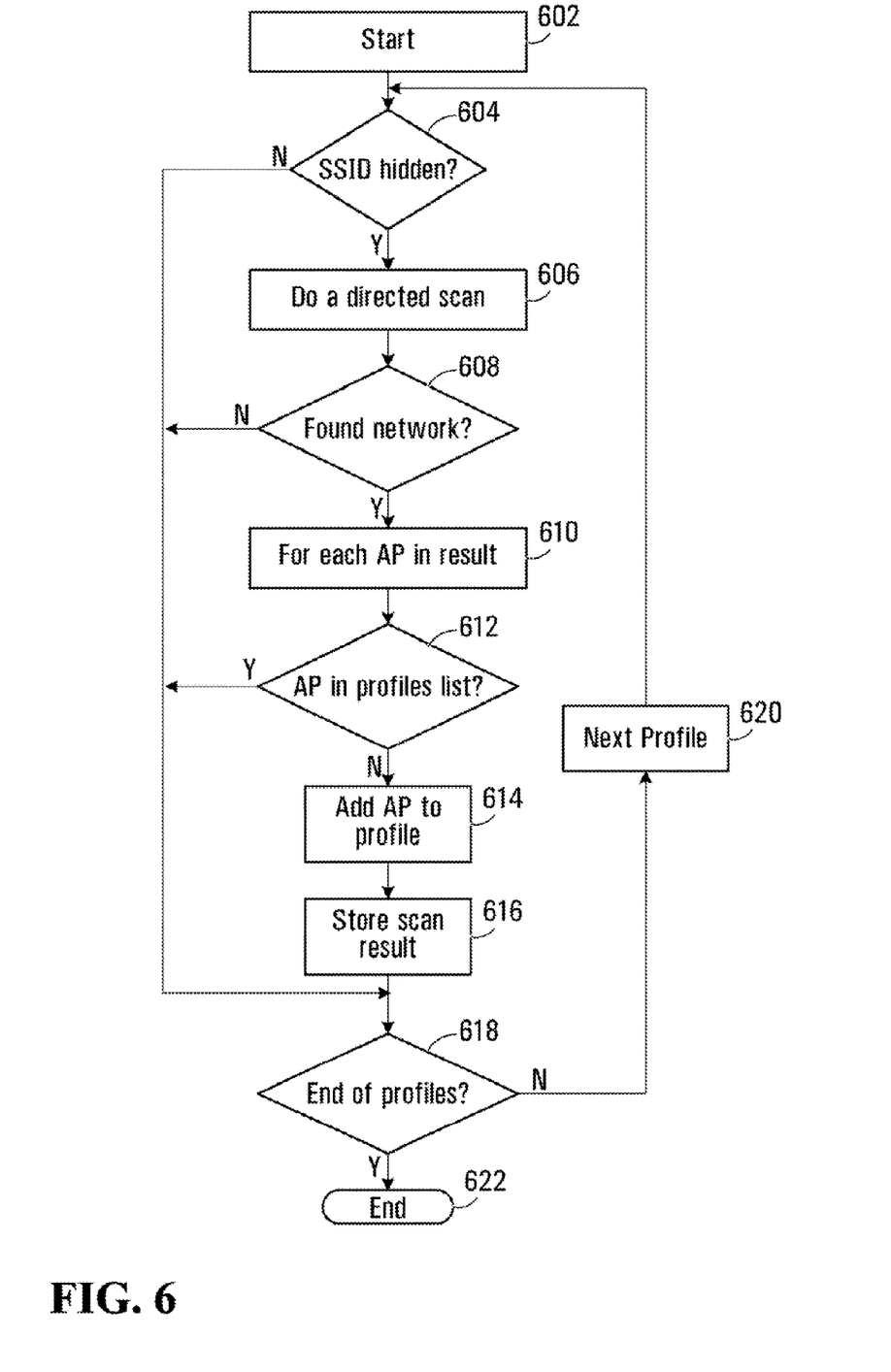
FIG. 6 is a flowchart of a method for conducting a directed profile scan to determine SSIDs for AP MAC addresses returned without SSIDs in reply to a broadcast scan.

A method for conducting a directed profile scan, as required at Step 422 of the method described in the discussion of FIG. 4 will now be described with reference to FIG. 6. The method is repeated for each profile in the profile table on the mobile device (Step 602). The first step is to determine if the SSID for the profile is hidden 604. This is done by checking the field in the table that includes the indication of hidden or not hidden. If the SSID is not hidden the method proceeds to Step 618 which asks if this is the end of the profiles. If the answer is yes, the method ends. If it is not the end of the profiles the method is proceeds to the next profile (Step 620) starting at Step 604. If the SSID is hidden, the method proceeds to Step 606, which is a directed scan for the network of that profile. Step 608 determines if the network was found using the directed scan. If the answer is no, the method proceeds to Step 618 described above that asks if this is the end of the profiles. If the network was found, the method proceeds with a process that is repeated for each AP in the result of the directed scan for the network (Step 610). The first step for each AP is to ask if the AP is listed in the profile list for the network. If the answer is no, the MAC address for the AP is added to the profile list (Step 614) and the scan result is stored (Step 616) in a memory on the mobile device together with the SSID, such as RAM (Random Access Memory). The method then proceeds to Step 618 and the determination of if it is the end of the profiles. If the answer is no, the method repeats (Step 620) starting at Step 604. It the answer is yes, the method ends.

As previously mentioned, passive scanning can be conducted by listening for the beacon transmitted by the AP. In some embodiments, if a beacon contains an SSID then the SSID can be compared with SSIDs stored on the mobile device. However, if the SSID is hidden then the methods described herein can be used. For example, first the MAC address detected in the beacon can be compared with stored MAC addresses. Then, if the MAC address is not stored on the mobile device, an active scan is performed for SSIDs with identifiers that are not expected to be received.

Referring now to FIG. 7, shown is a block diagram of another mobile device 780 that may implement any of the methods described herein. It is to be understood that the mobile device 780 is shown with very specific details for example purposes only.

A processing device (a microprocessor 728) is shown schematically as coupled between a keyboard 714 and a display 726. The microprocessor 723 controls operation of the display 726, as well as overall operation of the mobile device 780, in response to actuation of keys on the keyboard 714 by a user.

The mobile device 780 has a housing that may be elongated vertically, or may take on other sizes and shapes (including clamshell housing structures). The keyboard 114 may include a mode selection key, or other hardware or software for switching between text entry and telephony entry.

In addition to the microprocessor 728, other parts of the mobile device 780 are shown schematically. These include: a communications subsystem 770; a short-range communications subsystem 702; the keyboard 714 and the display 726, along with other input/output devices including a set of LEDS 704, a set of auxiliary I/O devices 706, a serial port 78, a speaker 711 and a microphone 712; as well as memory devices including a flash memory 716 and a Random Access Memory (RAM) 718; and various other device subsystems 720. The mobile device 780 may have a battery 721 to power the active elements of the mobile device 780. The mobile device 780 is in some embodiments a two-way radio frequency (RF) communication device having voice and data communication capabilities. In addition, the mobile device 80 in some embodiments has the capability to communicate with other computer systems via the Internet.

Operating system software executed by the microprocessor 728 is in some embodiments stored in a persistent store, such as the flash memory 716, but may be stored in other types of memory, devices, such as a read only memory (ROM) or similar storage element. In addition, system software, specific device applications, or parts thereof, may be temporarily loaded into a volatile store, such as the RAM 718. Communication signals received by the mobile device 780 may also be stored to the RAM 718.

The microprocessor 728, in addition to its operating system functions, enables execution of software applications on the mobile device 780. A predetermined set of software applications that control basic device operations, such as a voice communications module 730A and a data communications module 730B, may be installed on the mobile device 780 during manufacture. In addition, a personal information manager (PIM) application module 730C may also be installed on the mobile device 780 during manufacture. The PIM application is in some embodiments capable of organizing and managing data items, such as e-mail, calendar events, voice mails, appointments, and task items. The PIM application is also in some embodiments capable of sending and receiving data items via a wireless network 710. In some embodiments, the data items managed by the PIM application are seamlessly integrated, synchronized and updated via the wireless network 710 with the device user's corresponding data items stored or associated with a host computer system.

In addition, a software application to perform an address comparing function 730D may be installed, such as the address comparing function 314 described with reference to FIG. 3. The address comparing function 730D may implement any of the methods described herein for determining identifiers of wireless network.

As well, additional software modules, illustrated as another software module 730N, may be installed during manufacture.

What has been described is merely illustrative of the application of the principles of methods, modules and devices described herein. Other arrangements and methods can be implemented by those skilled in the art without departing from the spirit and scope of the embodiments.

The invention claimed is:

1. A method, in a wireless device, the method comprising:
   for at least one wireless network, storing on the wireless device a Service Set Identifier (SSID), at least one MAC address for a component in the network, and an indicator, the indicator indicating whether or not the stored SSID is expected to be provided with a MAC address for a component of the at least one wireless network;
   receiving, by means of passive scanning, a MAC address of a component in an available network;
   if the MAC address of the component of the available network is received with an SSID for the available network, comparing the received SSID with at least one stored SSID;
   if the received SSID matches the stored SSID and the indicator indicates that the SSID is not expected to be provided, updating the indicator to indicate that the SSID is expected to be provided; and
   if the MAC address of the component of the available network is received without an SSID, comparing the received MAC address with the at least one stored MAC address and
      if the MAC address of the component of the available network matches the at least one stored MAC address, obtaining the SSID stored in association with that MAC address; and
      if the MAC address of the component of the available network does not match any of the at least one stored MAC address, conducting a directed probe for availability of at least one wireless network having an indicator that the stored SSID is not expected to be provided.

2. A method according to claim 1, wherein the at least one network is a WLAN (Wireless Local Area Network).

3. A method according to claim 1, wherein the at least one component is an AP (Access Point).

4. The method of claim 1 further comprising:
   comparing MAC addresses received in response to the directed probe with at least one MAC address stored in association with the network for which the probe was conducted; and
   storing, in association with the network, any MAC addresses received in response to the directed probe that do not match any of the at least one stored MAC address.

5. A computer readable medium having computer executable instructions stored thereon for execution by a processor in a wireless device, that when executed implement the method according to claim 1.

6. A computer readable medium according to claim 5, wherein the network is a WLAN (Wireless Local Area Network).

7. A computer readable medium according to claim 5, wherein the component is an AP (Access Point).

8. A mobile device adapted to be connected to at least one wireless network, the mobile device comprising:
   a wireless access radio for communicating with the at least one wireless network;
   a memory, having stored thereon, for at least one wireless network, a Service Set Identifier (SSID), at least one MAC address for a component in the network, and an indicator, the indicator indicating whether or not the stored SSID is expected to be provided with a MAC address for a component of the at least one wireless network;
   a receiver for receiving, by means of passive scanning, a MAC address of a component in an available network;
   SSID comparing function for comparing the received SSID with at least one stored SSID, if the MAC address of the component of the available network is received with an SSID for the available network, and
   an updating function for updating the indicator to indicate that the SSID is expected to be provided, if the received SSID matches the stored SSID and the indicator indicates that the SSID is not expected to be provided,
   a MAC address comparing function for comparing the received MAC address with the at least one stored MAC address, if the MAC address of the component of the available network is received without an SSID; and
   a processor for:
      if the MAC address of the component of the available network matches the at least one stored MAC address, obtaining the SSID stored in association with that MAC address; and
      if the MAC address of the component of the available network does not match any of the at least one stored MAC address, conducting a directed probe for availability of at least one wireless network having an indicator that the stored SSID is not expected to be provided.

9. A mobile device according to claim 8, further comprising a user interface adapted to permit a user to select a wireless network to which to connect.

* * * * *